(12) United States Patent
Starkie

(10) Patent No.: US 7,917,363 B2
(45) Date of Patent: Mar. 29, 2011

(54) SYSTEM FOR PREDICTING SPEECH RECOGNITION ACCURACY AND DEVELOPMENT FOR A DIALOG SYSTEM

(75) Inventor: Bradford Starkie, Surrey Hills (AU)

(73) Assignee: Telstra Corporation Limited, Mebourne, Victoria (AU)

( * ) Notice: Subject to any disclaimer, the term of this patent is extended or adjusted under 35 U.S.C. 154(b) by 1245 days.

(21) Appl. No.: 10/545,762

(22) PCT Filed: Feb. 11, 2004

(86) PCT No.: PCT/AU2004/000156
§ 371 (c)(1),
(2), (4) Date: May 2, 2006

(87) PCT Pub. No.: WO2004/072862
PCT Pub. Date: Aug. 26, 2004

(65) Prior Publication Data
US 2006/0190252 A1    Aug. 24, 2006

(30) Foreign Application Priority Data

Feb. 11, 2003  (AU) ................................ 2003900584

(51) Int. Cl.
*G10L 15/00* (2006.01)
(52) U.S. Cl. ......................... 704/251; 704/257; 704/275
(58) Field of Classification Search .................. 704/251, 704/257, 275
See application file for complete search history.

(56) References Cited

U.S. PATENT DOCUMENTS

| | | | |
|---|---|---|---|
| 5,241,619 A | 8/1993 | Schwartz et al. | |
| 5,452,397 A * | 9/1995 | Ittycheriah et al. | 704/240 |
| 5,642,519 A | 6/1997 | Martin | |
| 5,737,723 A | 4/1998 | Riley et al. | |
| 5,860,063 A | 1/1999 | Gorin et al. | |
| 5,937,385 A * | 8/1999 | Zadrozny et al. | 704/257 |
| 6,016,470 A * | 1/2000 | Shu | 704/244 |
| 6,044,347 A | 3/2000 | Abella et al. | |
| 6,144,938 A | 11/2000 | Surace et al. | |
| 6,154,722 A | 11/2000 | Bellegarda | |

(Continued)

FOREIGN PATENT DOCUMENTS

EP    0312209 B1    11/1992

(Continued)

OTHER PUBLICATIONS

Ahonen, H., et al., "*Forming Grammars for Structured Documents: An Application of Grammatical Inference*," Procedure of the Second International Colloquium on Grammatical Inference and Applications, (1994) pp. 153-167.

Frost, R.A., "*Speechnet: A Network of Hyperlinked Speech-Accessible Objects*," International Conference on Advanced Issues of E-Commerce and Web-Based Information Systems, WECWIS, Ontario, Canada, (Apr. 8-9, 1999) pp. 116-121.

Gold, E. M., "*Language Identification in the Limit*," Academic Press (1967), pp. 447-474.

Hunt, A., et al., Speech Recognition Grammar Specification Version 1.0 <http://www.w3.org/TR/speech-grammar/>, W3C Recommendation, (2004) pp. 1-94.

(Continued)

*Primary Examiner* — Daniel D Abebe
(74) *Attorney, Agent, or Firm* — Nixon Peabody LLP

(57) ABSTRACT

A system for developing dialog systems estimates the speech recognition accuracy achievable when using a dialog system, and the number of example input phrases required to achieve a desired speech recognition accuracy. The maximum achievable speech recognition accuracy is also predicted. The development system thereby allows a developer of a dialog system to determine how and whether to continue development of the dialog system. The development system includes a grammatical inference engine for generating a grammar for the dialog system on the basis of example input phrases, and an in-grammar speech recognition accuracy estimator for generating the estimate of speech recognition accuracy on the basis of probabilities of confusing phonemes of input phrases with phonemes of the grammar.

33 Claims, 7 Drawing Sheets

U.S. PATENT DOCUMENTS

| | | | |
|---|---|---|---|
| 6,173,261 B1* | 1/2001 | Arai et al. | 704/257 |
| 6,269,336 B1 | 7/2001 | Ladd et al. | |
| 6,314,402 B1 | 11/2001 | Monaco et al. | |
| 6,321,198 B1 | 11/2001 | Hank et al. | |
| 6,411,952 B1 | 6/2002 | Bharat et al. | |
| 6,434,521 B1* | 8/2002 | Barnard | 704/244 |
| 6,493,673 B1 | 12/2002 | Ladd et al. | |
| 6,510,411 B1 | 1/2003 | Norton et al. | |
| 6,523,016 B1 | 2/2003 | Michalski | |
| 6,587,822 B2 | 7/2003 | Brown et al. | |
| 6,604,075 B1 | 8/2003 | Brown et al. | |
| 6,618,697 B1 | 9/2003 | Kantrowitz et al. | |
| 6,684,183 B1 | 1/2004 | Korall et al. | |
| 2001/0013001 A1 | 8/2001 | Brown et al. | |
| 2001/0016074 A1* | 8/2001 | Hamamura | 382/229 |
| 2002/0087325 A1* | 7/2002 | Lee et al. | 704/270.1 |
| 2002/0188454 A1* | 12/2002 | Sauber | 704/275 |
| 2003/0007609 A1 | 1/2003 | Yuen et al. | |
| 2003/0055651 A1 | 3/2003 | Pfeiffer et al. | |
| 2003/0069729 A1* | 4/2003 | Bickley et al. | 704/236 |
| 2004/0015350 A1* | 1/2004 | Gandhi et al. | 704/235 |
| 2005/0091057 A1 | 4/2005 | Phillips et al. | |
| 2006/0025997 A1 | 2/2006 | Law et al. | |
| 2006/0190252 A1 | 8/2006 | Starkie | |
| 2006/0203980 A1 | 9/2006 | Starkie | |
| 2008/0126089 A1* | 5/2008 | Printz et al. | 704/235 |
| 2008/0319738 A1* | 12/2008 | Liu et al. | 704/10 |

FOREIGN PATENT DOCUMENTS

| | | |
|---|---|---|
| EP | 0 685 955 A2 | 12/1995 |
| EP | 0 700 031 A1 | 3/1996 |
| EP | 0 890 942 A2 | 1/1999 |
| EP | 0 992 980 A2 | 4/2000 |
| EP | 1 207 518 A2 | 5/2002 |
| WO | WO 98/50907 A1 | 11/1998 |
| WO | WO 99/14689 A1 | 3/1999 |
| WO | WO 00/05708 A1 | 2/2000 |
| WO | WO 00/51016 | 8/2000 |
| WO | WO 00/78022 A1 | 12/2000 |
| WO | WO 02/37268 A2 | 5/2002 |
| WO | WO 02/063460 A2 | 8/2002 |
| WO | WO 02/103673 A1 | 12/2002 |
| WO | WO 2004/010678 A1 | 1/2004 |

OTHER PUBLICATIONS

Minker, W., "Stochastic Versus Rule-Based Speech Understanding for Information Retrieval," Speech Communications 25, Spoken Language Processing Group, LIMSI-CNRS, Orsay Cedex, France, (1998) pp. 223-247.

Nevill, C., et al., "Compression and Explanation Using Hierarchical Grammars," Computer Science Department, University of Waikato, New Zealand, The Computer Journal, vol. 40, No. 2/3, (1997) pp. 103-116.

Nuance V-Builder 2.0 NVP Edition Technical Data Sheet, <http://www.nuance.com/assets/pdf/vbuilder_tech_data_sheet_1102.pdf>, (2002) pp. 1-2.

Nuance V-Builder Web Page, <http://web.archive.org/web/20020201161856/www.nuance.com/products/vbuilder.html>, (2002) pp. 1-2.

Ramming, J. C., "PML: A Language Interface to Distributed Voice-Response Units," Lecture Notes in Computer Science, vol. 1686, (1998) pp. 97-112.

Stolcke, A., "Bayesian Learning of Probabilistic Language Models," Dissertation, University of California at Berley, (1994) pp. 1-84.

Telera AppBuilder Data Sheet, <http://telera.com/stageone/files/Telera/collateral/app_builder_3-2-_hi.pdf>, (2002) pp. 1-2.

The Voice Web Application Development Environment, Telera White Paper, <http://telera.com/stageone/files/Telera/collateral/AppDev_WP_4-18-02.pdf, (2001) pp. 1-8.

Van Zaanen, M., "Bootstrapping Structure into Language: Alignment-Based Learning," Phd Thesis, The University of Leeds School of Computing, (2001), pp. i-xi and 1-128.

Voxeo Designer 2.0 Web Page, <http://web.archive.org/web/20020205091431/community/voxeo.com/vd2.isp>, (2002) pp. 1-10.

Allen, J., "Natural Language Understanding," The Benjamin/Cummings Publishing Company Inc., Redwood City, CA USA (1995) pp. 46-53.

Garofolo, J., et al., "The DARPA TIMIT Acoustic-Phonetic Continuous Speech Corpus," NIST Speech Disc CD1-1.1, (Oct. 1990) pp. 342.

Levenstein, V. I., "Binary Codes Capable of Correcting Deletions, Insertions, and Reversals," Soviet Physics-Doklady, vol. 10, No. 9, (Feb. 1966) pp. 707-710.

Mitchell, T. M., "Machine Learning," Chapter 7. Computational Learning Theory, McGraw-Hill, Boston, MA USA (1997) pp. 201-227.

Rabiner, L. R., et al., "Fundamentals of Speech Recognition," Chapter 2. The Speech Signal: Production, Perception, and Acoustic-Phonetic Characterization, Prentice Hall, Englewood Cliffs, New Jersey USA (1993) pp. 11-37.

Ryan, T. P., "Modern Regression Methods," John Wiley and Sons, Inc. (1996) pp. 21-30.

Aho, A. V., et al., "The Theory of Parsing, Translation, and Compiling," Prentice-Hall, Englewood Cliffs, New Jersey, (1972) p. 146.

Angluin, D., "Inference of Reversible Languages," Journal of the Association for Computational Machinery, vol. 29, No. 3, (1982) pp. 741-765.

Knuth, D. E., "Semantics of Context-Free Languages," originally published in Mathematical Systems Theory 2, (1968) pp. 127-145, republished in "Selected Papers in Computer Languages," CSLI Publications, Center for the Study of Languages and Information, (2003) pp. 377-400.

Harris, Z. S., "Structural Linguistics," University of Chicago Press, Chicago, IL, USA and London, UK, $7^{th}$ edition (1966), formerly entitled: "Methods in Structural Linguistics," (1951) pp. 243-299.

ISO/IEC 13211-1:1995, "Information Technology—Programming languages—Prolo—Part 1: General core," International Organization for Standardization, New York, New York, (1995) pp. 1-199.

Sakakibara, Y., "Efficient Learning of Context-Free Grammars from Positive Structural Examples ," Information and Computation 97, (1992) pp. 23-60.

Starkie, B., "Inferring Attribute Grammars with Structured Data for Natural Language Processing," $6^{th}$ International Colloquium, ICGI 2002, Berlin Germany: Springer-Verlag, (2002) pp. 1-12.

Thomas I., et al., "Extracting Phoneme Pronunciation Information from Corpora," Proceedings of the Joint Conference on New Methods in Language Processing and Computational Language Learning, Association for Computational Linguistics, Somerset, New Jersey, (1998) pp. 175-183.

VoiceXML Forum, <http://www.voicexml.org>, (2007) pp. 1-2.

Starkie, et al., LYREBIRD: Developing Spoken Dialog Systems Using Examples, Telstra New Wave Pty Ltd., Jan. 1, 2002 XP-002519592, URL: http://www.springerlink.com/content/9fq6d5lu0mqa7mtj/>, pp. 1-3.

Starkie, Programming Spoken Dialogs Using Grammatical Inference, Telstra New Wave Pty Ltd., A1 2001 Advances in Artificial Intelligence, XP002519591, pp. 449-460.

Levin, et al, A Stochastic Model of Human-Machine Interaction for Learning Dialog Strategies, IEEE Transactions on Speech and Audio Processing, (Jan. 2000) pp. 11-23, vol. 8, No. 1, New York, NY US, Publisher Item Identifier S 1063-6676(00)00296-0.

Lopez-Cozar, et al., Testing Dialogue Systems by Means of Automatic Generation of Conversations, Interacting with Computers, Science Direct—on-line, (Jul. 2002) Elsevier Science B.V. Issn: 0953-5438, pp. 1-21, XP-002569525, http://www.sciencedirect.com, European Patent Office, http://dx.doi.org/10.1016/S0953-5438(02)0019-X> [Retrieved on Feb. 19, 2010 from the Internet].

* cited by examiner

SYSTEM FOR PREDICTING SPEECH RECOGNITION ACCURACY AND DEVELOPMENT FOR A DIALOG SYSTEM

FIELD OF THE INVENTION

The present invention relates to dialog systems, and in particular to a system and process for predicting the speech recognition accuracy of a dialog system, and the number of speech examples required to build the language models of a dialog system.

BACKGROUND

A dialog system has a text or audio interface, allowing a human to interact with the system.

Particularly advantageous are 'natural language' dialog systems that interact using a language syntax that is 'natural' to a human. A dialog system is a computer or an Interactive Voice Response (IVR) system that operates under the control of a dialog application that defines the language syntax, and in particular the prompts and grammars of the syntax. For example, IVRs such as Nortel's Periphonics™ IVR are used in communications networks to receive voice calls from parties. An IVR is able to generate and send voice prompts to a party and receive and interpret the party's voice responses made in reply. However, the development of a dialog system is cumbersome and typically requires expertise in both programming and the development of grammars that provide language models. Consequently, the development process is often slower than desired.

A particular difficulty encountered when developing a dialog system is the inability to predict (i) the effort required to develop the system, and (ii) the speech recognition accuracy when the dialog system uses speech recognition. These are important issues for developers of dialog systems, because a decision to develop a dialog system based on an underestimate of the effort required, and/or an overestimate of the recognition accuracy that will be achieved, can result in an expensive investment that does not deliver the required results. State of the art speech recognition systems use language models, typically in the form of probabilistic, context-free attribute grammars, to improve performance. If the grammar coverage is too small, a large proportion of utterances received by the system will not be correctly recognised because they are not included in the allowed set of responses. On the other hand, this will also occur if the grammar coverage is too large, because the speech recognition task becomes too difficult.

It is desired to provide a system and process for use in developing a dialog system that alleviate one or more of the above difficulties, or at least provide a useful alternative to existing development systems and processes.

SUMMARY OF THE INVENTION

In accordance with the present invention, there is provided a process for estimating the speech recognition accuracy of a dialog system, including:
  generating a grammar from a plurality of example phrases;
  determining respective probabilities for correctly identifying words of an input phrase with corresponding words of said grammar; and
  generating a probability for correctly recognising said input phrase by multiplying said respective probabilities.

The present invention also provides a process for predicting in-grammar speech recognition accuracy of a dialog system, including comparing phonetic similarities of phrases allowed by a grammar for said dialog system and example phrases.

The present invention also provides a process for use in developing a dialog system, including:
  generating a grammar for said dialog system on the basis of example input phrases for said dialog system; and
  generating an estimate of speech recognition accuracy achievable when using said dialog system on the basis of probabilities of confusing phonemes of input phrases with phonemes of said grammar to allow a developer of said dialog system to determine development of said dialog system.

The present invention also provides a process for use in developing a dialog system, including:
  generating grammars for said dialog system on the basis of respective sets of example input phrases for said dialog system, said sets including different numbers of example input phrases;
  determining, on the basis of said grammars, a relationship between a number of example input phrases and an estimated probability that an input phrase is correctly recognised; and
  generating an estimate of the number of example input phrases required to achieve a predetermined speech recognition accuracy when using said dialog system to allow a developer of said dialog system to determine development of said dialog system.

The present invention also provides a process for use in developing a dialog system, including generating estimate data representative of the number of example phrases required to achieve a predetermined speech recognition accuracy when using said dialog system.

The present invention also provides a process for predicting development of a dialog system, including:
  providing example phrases for said spoken dialog system;
  generating a test set and training sets of various sizes from said example phrases;
  generating respective grammars from said training sets;
  determining respective portions of said test set not predicted by said grammars;
  determining a relationship between said portions and said sizes; and
  determining a probability that a spoken phrase provided to said dialog system is consistent with at least one of said grammars.

The present invention also provides a process for use in developing a dialog system, including:
  generating first function data, representing the respective probabilities that a phrase provided to said dialog system is predicted by grammars of said dialog system as a function of the number of example phrases used to generate said grammars;
  generating second function data, representing the probability that an in-grammar phrase provided to said dialog system is correctly recognised as a function of the number of example phrases used to generate said grammars;
  generating a third function on the basis of said first function and said second function, said third function representing the probability that a spoken phrase provided to said system is correctly recognised as a function of the number of examples used to generate said grammars.

The present invention also provides a system for developing a dialog system, including:

a grammatical inference engine for generating a grammar for said dialog system on the basis of example input phrases for said dialog system; and an in-grammar speech recognition accuracy estimator for generating an estimate of speech recognition accuracy achievable when using said dialog system on the basis of probabilities of confusing phonemes of input phrases with phonemes of said grammar to allow a developer of said dialog system to determine development of said dialog system.

The present invention also provides a system for developing a dialog system, including:

a grammatical inference engine for generating grammars for said dialog system on the basis of respective sets of example input phrases for said dialog system, said sets including different numbers of example input phrases;

a learning curve estimator for determining, on the basis of said grammars, a relationship between a number of example input phrases and an estimated probability that an input phrase is correctly recognised; and an estimator for generating an estimate of the number of example input phrases required to achieve a predetermined speech recognition accuracy when using said dialog system to allow a developer of said dialog system to determine development of said dialog system.

BRIEF DESCRIPTION OF THE DRAWINGS

Preferred embodiments of the present invention are hereinafter described, by way of example only, with reference to the accompanying drawings, wherein.

DETAILED DESCRIPTION OF THE PREFERRED EMBODIMENTS

Figure 1:
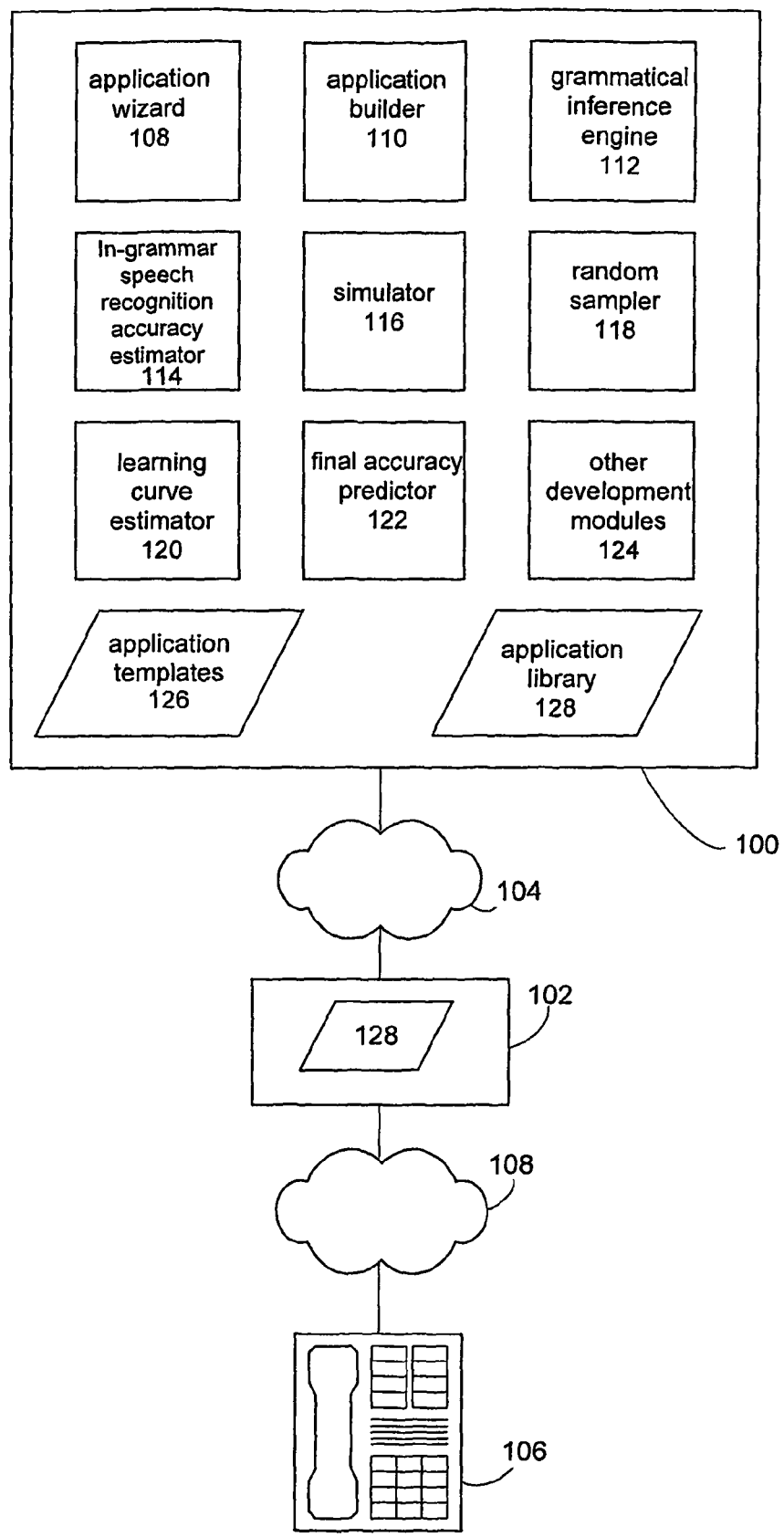
FIG. 1 is a schematic diagram of a preferred embodiment of a natural language development system connected to an IVR via a communications network, with the IVR connected to a telephone via a telecommunications network.

As shown in FIG. 1, a natural language development system 100 includes natural language development modules 108 to 124. The development modules 108 to 124 include an application wizard 108, an application builder 110, a grammatical inference engine 112, an in-grammar speech recognition accuracy estimator 114, a simulator 116, a random sampler 118, a learning curve estimator 120, a final accuracy predictor 122, and other development modules 124. The development system 100 can be connected to a VoiceXML-enabled interactive voice response system (IVR) 102 via a communications network 104.

The development system 100 executes a natural language development process that allows a developer to develop a natural language dialog system using a graphical user interface of the development system 100. The development system 100 generates a dialog application 128 that can be installed on the IVR 102 via the network 104 to create and configure the dialog system. A standard telephone 106 can be used to access the IVR 102 via the public switched telephone network (PSTN) 108, allowing a user of the telephone 106 to interact with the natural language dialog system by speaking into the telephone 106 to provide speech input to the dialog system in response to voice prompts provided by the dialog system. Alternatively, the natural language application development system 100 can generate a natural language dialog application for execution by a standard computer system to provide a dialog system that can accept speech (i.e., audio) input. The development system 100 constitutes an integrated development environment (IDE) for the development of natural language systems.

In the described embodiment, the natural language application development system 100 is a standard computer system, such as an Intel™-based personal computer executing a Microsoft Windows™ operating system, and the natural language application development process is implemented by the natural language development modules 108 to 124, being software modules stored on non-volatile memory of the development system 100. However, it will be apparent to those skilled in the art that at least parts of the natural language application development process or modules can be alternatively implemented by dedicated hardware components such as application-specific integrated circuits (ASICs). The IVR 102 may be a Nortel Periphonics™ IVR. The IVR 102 executes a dialog application that includes VoiceXML language elements. However, the dialog application could alternatively include elements of any language that can be used to define a spoken dialog application, such as VOXML or a proprietary language. The network 104 can be any communications network that enables the dialog application to be loaded onto the IVR 102, such as an Ethernet LAN or WAN.

Figure 2:
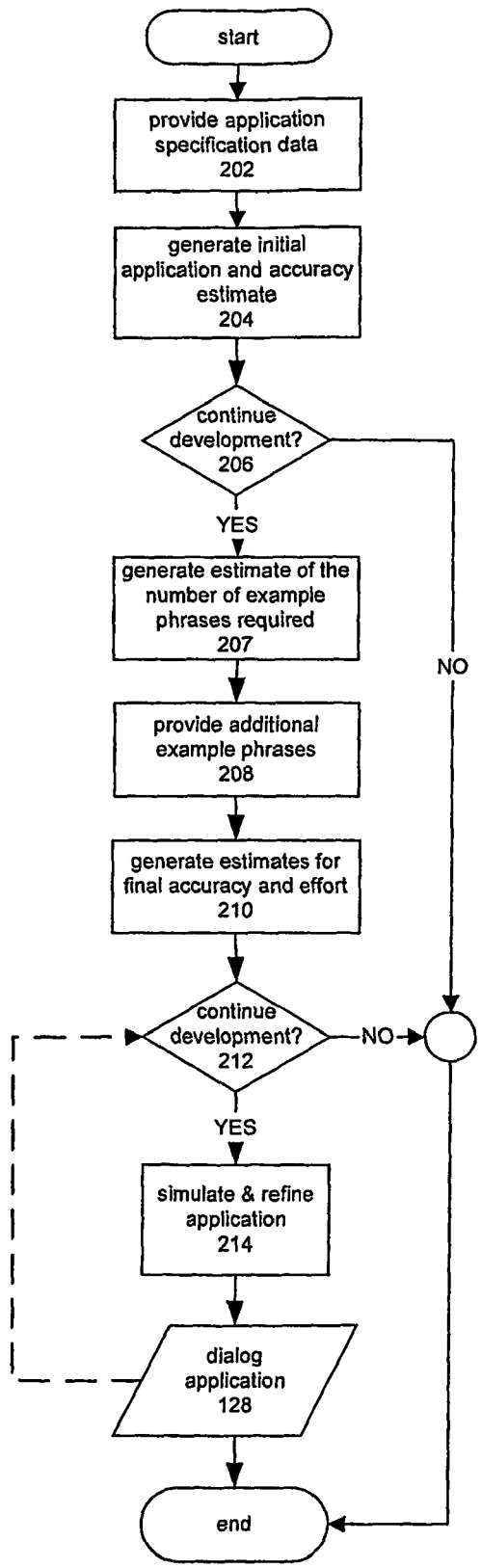
FIG. 2 is a flow diagram of a development process of the natural language application development system.
Figure 3:
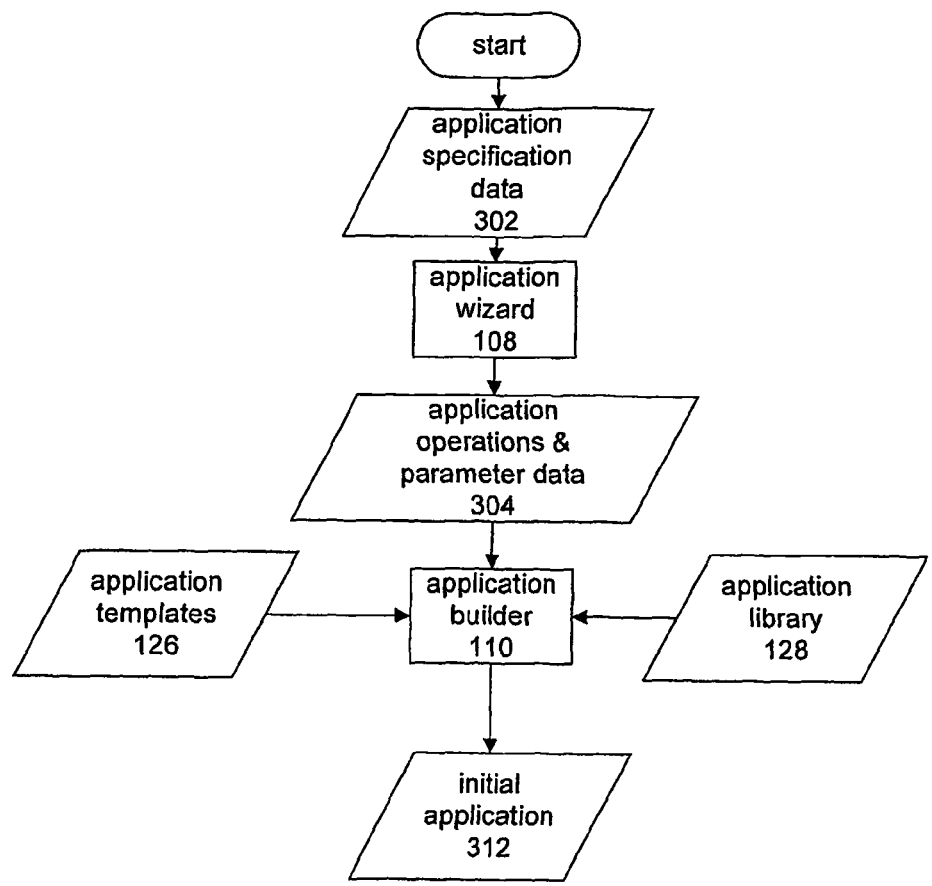
FIGS. 3 to 4 are schematic diagrams showing operation of components of the natural language application development system.
Figure 3:
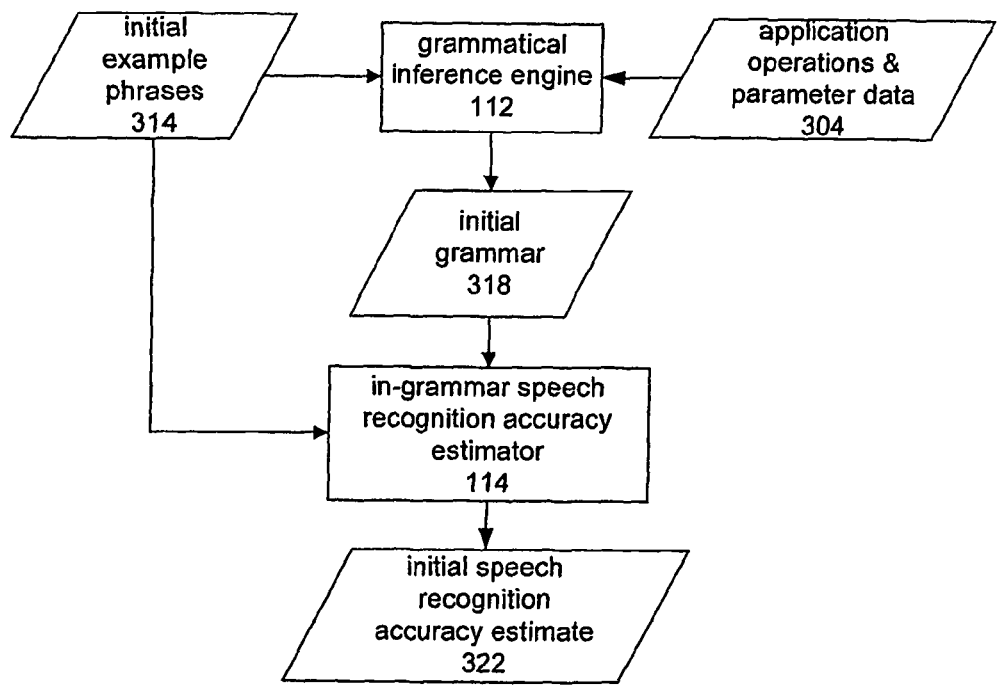

A dialog system can be developed by the development system 100 using a development process, as shown in FIG. 2, that begins when a developer provides application specification data 302 to the application wizard 108 of the development system 100 at step 202, as shown in FIG. 3. At step 204, the development system 100 generates an initial estimate generation application and estimate of the speech recognition accuracy by executing an initial application and accuracy estimate generation process 204, as described below.

The application specification data 302 provides a high level description of the dialog system being developed. This includes defining operations or tasks that are to be performed by the dialog system, by providing the name of each corresponding task, along with information that needs to be collected and the information that is created as a result of executing the operation, along with the type of each item of information. For example, the developer can specify that the dialog system is a stock or share system with "buy" and a "quote" operations. The "buy" operation requires a stock name, a stock quantity and a stock price. The quantity is of predefined type integer and the price is of predefined type money. The values that the stock name can take are defined by providing a list of all available stock names. The developer can also specify a number of predefined options for the dialog system, for example, the developer can specify that the dialog system is not protected by a personal identification number (PIN) and does not allow callers to leave messages or to transfer to an operator.

Figure 5:
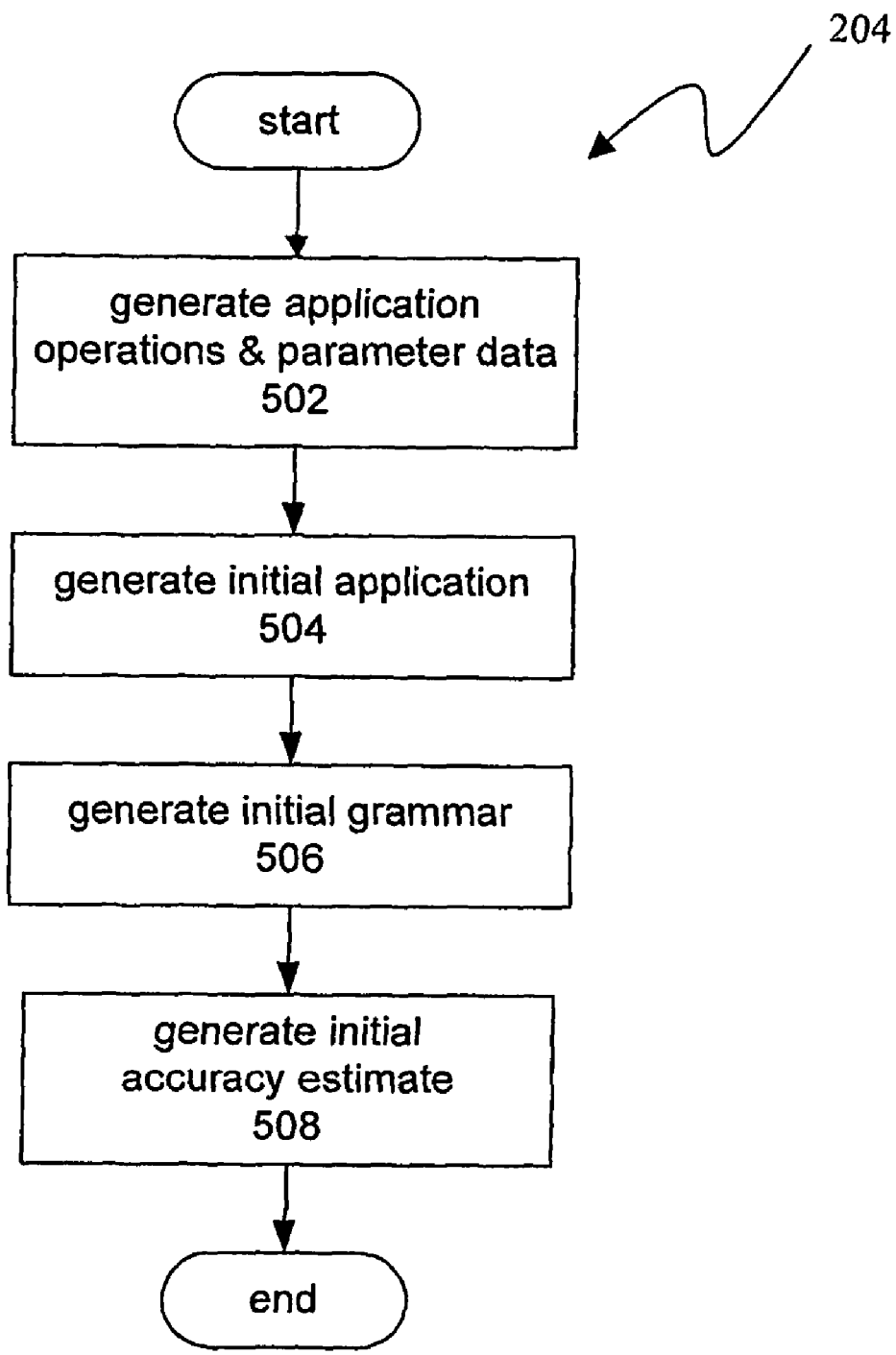
FIG. 5 is a flow diagram of an initial application and accuracy estimate generation process of the development process.

As shown in FIG. 5, with reference to FIG. 3, the initial application and accuracy estimate generation process 204 begins at step 502 when the application wizard 108 receives the application specification data 302 and uses it to generate application operations and parameter data 304.

At step 504, the application builder 110 generates an initial application 312 on the basis of the application operations and parameter data 304 and rules defined by application templates 126, as described in International Patent Publication number WO 00/78022, A Method of Developing An Interactive System ("Starkie"). Alternatively, the initial application 312 can be based on an existing dialog application selected from a list of predefined applications stored in an application library 128 of the development system 100. For example, the application library 128 may define a telephone ordering system whereby a user can list products that can be purchased along with their prices and available quantities. The application builder 110 can generate the initial application 312 by adding new code generated on the basis of the application operations and parameter data 304 and an application template 126 to a copy of the selected application from the application library 128.

After the initial application 312 has been generated, the developer is prompted to provide a number of initial example phrases 314 for each of the questions or prompts generated by the initial application 312.

At step 506, the grammatical inference engine 112 generates an initial speech recognition grammar 318 from the application operations and parameter data 304 generated by the application wizard 108, and the initial example phrases 314, as described in Starkie.

Figure 7:
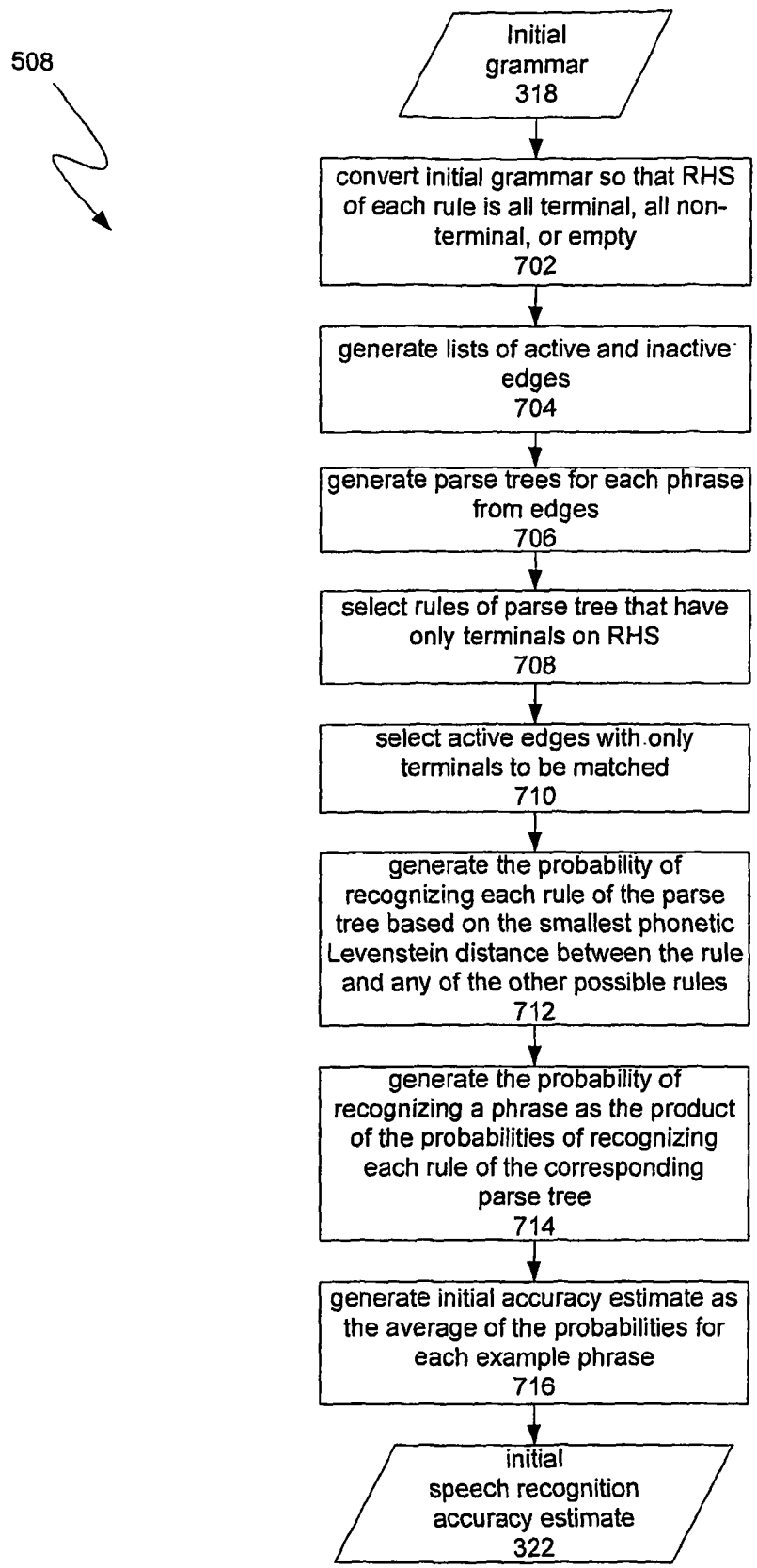
FIG. 7 is a flow diagram of an initial accuracy estimation process of the initial application and accuracy estimate generation process.

At step 508, the in-grammar speech recognition accuracy estimator 114 executes an initial accuracy estimation process, as shown in FIG. 7, to generate an initial speech recognition accuracy estimate 322 based on the initial recognition grammar 318 and the initial example phrases 314. This is an estimate or prediction of the recognition accuracy that would be obtained, on average, if a typical user attempted to speak those initial example phrases 314 to a speech recognition system that uses the initial recognition grammar 318. The in-grammar speech recognition accuracy predictor 114 estimates the in-grammar speech recognition accuracy using one of two alternative methods.

In the first method, the in-grammar speech recognition accuracy predictor 114 generates a number of example phrases from the initial speech recognition grammar 318. The accuracy predictor 114 then executes a small voice recording module (not shown). The recording module displays to the developer a textual representation of the first example phrase to be recorded. Once the developer has recorded the first phrase, this is repeated for the remaining phrases until all the example phrases have been recorded. The actual speech recognition accuracy obtained when recognising these example phrases is used as an estimate of the in grammar speech recognition accuracy.

In the second method, a measure of phonetic distance is used to predict speech recognition accuracy, based on predetermined independent probabilities of confusing one phoneme with another, and probabilities of inserting and deleting phonemes, as shown in Table 2 below. These probabilities are obtained experimentally and are independent of the application. Rather, they depend on the speech recognition configuration, including the language used (e.g., whether Japanese or French), the speech recognition software used, and speech recognition configuration parameters such as pruning and end-pointing parameters.

TABLE 1

| Symbol | Meaning |
| --- | --- |
| $P(\text{confuse}(p_i, p_j))$ | probability of confusing phoneme i with phoneme j |
| $P(\text{confuse}(-, p_j))$ | probability of inserting phoneme j |
| $P(\text{confuse}(p_i, -))$ | probability of deleting phoneme I |

From these probabilities, the probability of confusing one phrase with another can be estimated using a variation of the edit distance or Levenstein distance, as described in Levenstein, V. I., 1966, *Binary codes capable of correcting deletions, insertions and reversals*, in Sov. Phys. Dokl., pp 6:707-710 ("Levenstein"). The Levenstein distance is a measure of the cost of translating a sequence of symbols into another sequence of symbols. Specifically, the Levenstein distance between two strings is the minimum number of insertions, deletions and substitutions required to translate one string into the other.

The Levenstein distance can be determined using a two dimensional matrix process, as described in Levenstein. Briefly, values are inserted into elements in a matrix, according to the equations:

$$T[i, j] = \min \begin{cases} T[i-1, j-1] + Sub(x_i, y_j), \\ T[i-1, j] + Del(x_i), \\ T[i, j-1] + Ins(y_j) \end{cases}$$

$$T[0, 0] = 0$$

where $Sub(x_i, y_j)$ represents the cost of the substitution of $x_i$, the ith symbol of the starting string x, with $y_j$, the jth symbol of the final string y; $Del(x_i)$ represents the cost of the deletion of symbol $x_i$ from x; and $Ins(y_j)$ represents the cost of the insertion of symbol $y_j$ into x. The cost of insertion, deletion or substitution is usually defined to be equal to 1. When all elements of the matrix have been determined, paths through the matrix from the top left hand corner to the bottom right hand corner represent different alignments, or ways of translating one string into the other. The value in the bottom right hand corner of the matrix represents the minimum edit distance.

The following pseudo-code generates one alignment (in the initially null matrix variable "result") that has an edit distance equal to the minimum edit distance, given the two-dimensional matrix T, a starting string x of length n, and a final string y of length m.:

```
i=n; j=m;
while((i!= 0) && (j != 0)) {
    if (T[i,j]=T[i-1,j-1]+Sub(x_{x-1},y_{j-1})) { result = ( x_{i-1} ) + result
                 ( y_{j-1} )

i = i - 1;
        j = j - 1;

} else if(T[i,j]=T[i-1,j]+Del(x_{i-1})) } result = ( x_{i-1} ) + result;
                 (  -    )

i = i - 1;
```

-continued

```
    } else {
```
$$\text{result} = \begin{pmatrix} - \\ y_{j-1} \end{pmatrix} + \text{result};$$
$$j = j - 1;$$
```
        }
    }
    while(i != 0) {
```
$$\text{result} = \begin{pmatrix} x_{i-1} \\ - \end{pmatrix} + \text{result};$$
$$i = i - 1;$$
```
    }
    while(j != 0) }
```
$$\text{result} = \begin{pmatrix} - \\ y_{j-1} \end{pmatrix} + \text{result};$$
$$j = j - 1;$$
```
    }
```

Where the statements of the general form $$\text{result} = \begin{pmatrix} x_{i-1} \\ y_{j-1} \end{pmatrix} + \text{result}$$

represent the insertion of a new matrix column into the matrix result, and the symbol "-" represents a gap in the corresponding string.

The in-grammar speech recognition accuracy predictor 114 uses a variation on this matrix process that determines an initial estimate of the probability of confusing one phoneme string with another. This estimate is hereinafter referred to as the phonetic distance. The standard matrix process is varied by using the probability function P(confuse $(p_i,p_j)$) in place of the cost function Sub$(p_i,p_j)$ which represents the cost of substituting phoneme i with phoneme j. Similarly, P(confuse(-,$p_j$)) is used instead of Ins($y_j$), and P(confuse($p_i$,-)) is used instead of Del($x_i$). The phonetic distance is then determined using the following function for generating matrix elements:

$$T[i, j] = \max \begin{cases} T[i-1, j-1] \times P(\text{Confuse}(x_i, y_j)), \\ T[i-1, j] \times P(\text{Confuse}(x_i, -)), \\ T[i, j-1] \times P(\text{Confuse}(-, y_j)) \end{cases}$$

Because probabilities of confusion are used, and each matrix element is selected to maximize the corresponding cumulative confusion probability, the value in the bottom right-hand corner of the matrix now represents the most probable alignment for confusing the two strings, and is the phonetic distance. An alignment that has a probability equal to the maximum probability alignment can then be extracted from the matrix using the process described above for generating an alignment from a matrix. Both the standard Levenstein distance method and the variation described above that maximises probability rather than minimising edit distance have the useful property that for determining alignments between two strings of length m and n, respectively, the time taken to compute the maximum probability alignment is given by K×m×n, where K is the time to calculate a maximum probability alignment of two strings of length 1. This is because the matrix has dimensions of m×n.

The phonetic distance version of Levenstein distance determines equal or fewer alignments than does the standard matrix process, and enables the probability of the maximum probability alignment to be determined without actually determining what that alignment is. For example, consider the two words "way" and "eight". The pronunciations of these two words using the Arpabet notation, as described in Rabiner, L. R., and Juang, B. H., *Fundamentals of Speech Recognition*, Prentice Hall, Englewood Cliffs, N.J., 1993, are "w ey" and "ey t" respectively. Using the standard Levenstein distance, two alignments are possible:

$$\begin{pmatrix} w \\ ey \end{pmatrix}\begin{pmatrix} ey \\ t \end{pmatrix} \text{ and } \begin{pmatrix} w \\ - \end{pmatrix}\begin{pmatrix} ey \\ ey \end{pmatrix}\begin{pmatrix} - \\ t \end{pmatrix}$$

However, the probability of recognising a phoneme correctly is high, and the probability of inserting or deleting a phoneme is significantly higher than confusing a stop with a vowel. As a result, the probability of the first alignment above is around 100 times lower than probability of the second alignment. The modified version of the Levenstein distance returns only the second alignment as the most likely way to confuse the word "way" with the word "eight".

The modified Levenstein distance process uses a confusion matrix that describes the probability of confusing one phoneme with another. One way of creating such a matrix is to estimate it from a phonetically transcribed corpus comprising a large number of recorded spoken phrases along with a phonetic transcription that describes the phrases using a phonetic language such as Arpabet. One such corpus is J. Garofolo, L. Lamel, W. Fisher, J. Fiscus, D. Pallett, and N. Dahlgren, *The DARPA TIMIT acousticphonetic continuous speech corpus*, CDROM, 1986. 342

To estimate the probability of confusing one phoneme with another, a language model is created that allows arbitrarily long sequences of phonemes where any phoneme can follow any other phoneme. A speech recognisor using this language model is then used to process the corpus, resulting in a list of recognised phonemes along with the actual phonemes spoken. Alignments are then created to align the actual phoneme sequences with the recognised phoneme sequences. Unfortunately, to do this with any accuracy requires the probabilities of the phonemes to be known before they can be measured. This is because the most probable alignment between the recognised phoneme sequence and the actual phoneme sequence depends upon the probability of the confusing one phoneme with another.

To overcome this problem, a technique known as expectation maximisation can be used. Firstly, an initial confusion matrix (M1) that estimates of the probability of confusing one phoneme with another is used to determine the most probable alignments between the recognised phoneme sequences and the actual phoneme sequences. Using this set of alignments, a second confusion matrix (M2) can be constructed by counting the number of times a particular phoneme was confused with another (P(confuse $(p_i,p_j)$)), the number of times a particular phoneme was inserted (P(confuse(-,$p_j$))), and the number of times a particular phoneme was deleted (P(confuse $(p_i,-)$). The confusion matrix M2 can then be copied into confusion matrix M1, and the process repeated until the matrix M2 does not change from one iteration to another. One solution is to use a related confusion matrix as values for confusion matrix M1. A confusion matrix described in Thomas I., Zuckerman I., and Raskutti B., *Extracting Phoneme Pronunciation Information from Corpora*, Proceedings of the Joint Conference on New Methods in Language Processing and Computational Language Learning", 1998, Association for Computational Linguistics, Somerset, N.J. pp 175-183, describes the probability that a human speaker will either utter the wrong phoneme (P(confuse $(p_i,p_j)$)), insert a particular phoneme (P(confuse($-,p_j$))), or delete a particular phoneme (P(confuse($p_i,-$),) when speaking. These values can be used to construct the initial confusion matrix M1.

Using the modified Levenstein distance and a suitable confusion matrix, the probability of confusing one sequence of phonemes with another in the absence of a grammar can be estimated. However, a more useful technique of predicting speech recognition accuracy is one that can predict speech recognition accuracy when the grammar that will be used to recognise a particular phrase is known. A process for doing this is described below.

When a phrase is parsed by a context-free grammar, there are a number of decision branching points. These branching points correspond to points in the recognition process when one of several rules is selected.

For example, consider the following grammar:

.S→from City ToCity-(1)

City→Melbourne-(2)

City→sydney-(3)

ToCity→to City-(4)

ToCity→-(5)

In this notation, each line represents a rule whereby the symbol on the left hand side can be expanded into the symbols on the right hand side of the rule. Symbols are defined as either terminal or non-terminal symbols. A non-terminal symbol is a symbol that can be expanded into other symbols. A non-terminal can appear on either the left hand side or the right hand side of a rule, and always begins with an upper case letter. In contrast, a terminal symbol cannot appear on the left hand side of a rule, and always begins with a lower case letter. The non-terminal ".S" is a special non-terminal that can represent an entire sentence. The numbers in parentheses at the end of each line are rule numbers. Rule number 5 does not contain a right hand side. This implies that the non-terminal ToCity can either be expanded in "to City" or nothing at all. That is, the non-terminal symbol ToCity represents an optional phrase.

Consider the phrase "from melbourne to sydney". For this phrase to be correctly parsed, the four rule selection decisions need to be made, as shown in Table 2 below.

TABLE 2

| Correct rule | Sample space (possible rules) |
|---|---|
| 1 | 1 |
| 2 | 2 & 3 |
| 4 | 4 & 5 |
| 3 | 2 & 3 |

For the phrase to be parsed correctly, each of the four branching point decisions needs to be made correctly. Therefore the probability of correctly recognising this phrase is equivalent to the probability of selecting all the correct rules. These decisions are considered as independent events, and this probability is therefore estimated as the product of the probabilities of selecting each of the r rules required to parse the phrase:

$$P(\text{recognition}|\text{ingrammar}) = \prod_r P(\text{selecting}(\text{rule}_r)) \quad (1)$$

The probability of selecting the correct rule is based on the probabilities of confusing the correct phrase, represented as a string of phonemes, with a set of possible alternative phrases. In order to represent the parsing of a phrase by a grammar, i.e., as a set of decision points, where each decision point corresponds to the probability of confusing one string of phonemes with another, the grammar is first transformed (at step 702 of the initial accuracy estimation process) from the standard form described above. Specifically, the grammar is converted to a form in which the right-hand side of each rule contains either (i) only terminal symbols, (ii) only non-terminals, or (iii) no symbols at all. This is achieved by iterating through the rules one at time. As each rule is examined, it is determined whether or not it is already in the correct form. If the rule is not in the correct form, then a new rule is created for each sequence of terminal symbols on the right hand side of any rule containing non-terminal symbols on its right hand side. Each new rule is assigned a new non-terminal name, and the sequence of terminal characters in the old rule is replaced by the new non-terminal name. For instance, in the example above, rule 1 is replaced by new rules 6 and 7, as follows:

.S→X1 City ToCity-(6)

X1→from-(7)

Thus the terminal "from" is replaced with the non-terminal "X1" so that rule (6) contains only non-terminals, and the new rule (7) contains only the terminal "from". The original rule (1) is deleted. When this procedure is applied to all of the rules in the example above, the grammar becomes as follows:

City→Melbourne-(2)

City→sydney-(3)

ToCity→-(5)

.S→X1 City ToCity-(6)

X1→from-(7)

ToCity→X2 City-(8)

X2→to-(9)

To determine branching points for parsing a phrase given a grammar, a top-down chart parser is used, as described in J. Allen, *Natural Language Understanding*, The Benjamin/Cummings Publishing Company Inc, Redwood City, Calif. USA, 1995. A chart parser uses a structure known as a chart that keeps track of possible ways in which a grammar can be expanded to generate a substring of the phrase being parsed. The in-grammar speech recognition accuracy estimator 114 includes a top-down chart parser that generates two lists of structures referred to as edges. Each edge refers to a rule that can potentially be expanded to generate a substring of the phrase. An edge can be represented as a five-tuple:

<a, b, lhs, matched, to be matched>, where:

a=an index to the word to the left of the edge; e.g., 1=the first word;

b=an index to the last word in the edge; e.g., 1=the first word;

lhs=the symbol on the left hand side of the rule;

matched=the words in the rule that have been found; and to be matched=the words in the rule that have not been found.

Using the same notation, edges are created to represent the words in the sentence. These edges are denoted:

<a,b,lhs,>, where:

a=an index to the previous word; e.g., 1=the first word b=an index to word; e.g., 1=the first word lhs=the word itself.

An edge in which all symbols in the rule have been found is referred to as an inactive edge. An edge that contains one or more words in the rule that have not been found is referred to as an active edge. During parsing, the chart parser generates a list of inactive edges and a list of active edges at step 704. When the chart parser completes the top-down parsing, the list of inactive edges contains at least one edge that covers the phrase. This edge also represents the corresponding parse tree. In addition, the list of active edges contains a list of edges that describe, at each word in the phrase, possible substrings that are consistent with the grammar, and the preceding words in the phrase.

For instance, in the example above, the following list of inactive edges is generated, in sequence (with explanatory text within parentheses to the right of each edge):

| | |
|---|---|
| <0,1,from,,> | (word 1: "from") |
| <0,1,X1,from,> | (word 1 matches rule 7) |
| <1,2,melbourne,,> | (word 2: "melbourne") |
| <1,2,City,Melbourne,> | (word 2 matches rule 2) |
| <2,2,ToCity,,> | (The empty rule 5 matches) |
| <0,2,.S,X1 City ToCity,> | (The first two words form a complete sentence) |
| <2,3,to,,> | (word 3: "to") |
| <2,3,X2,to,> | (word 3 matches rule 9) |
| <3,4,sydney,,> | (word 4: "sydney") |
| <3,4,City,Sydney,> | (word 4 matches rule 3) |
| <2,4,ToCity,X2 City,> | (words 3 & 4 match rule 8) |
| <0,4,.S,X1 City ToCity,> | (the complete phrase matches rule 6) |

Of these, only the last edge describes a complete parse of the phrase. At step 706, the corresponding parse tree is determined from this edge and the edges matching non-terminals with terminals, as follows:

(.S(X1 from) (City melbourne) (ToCity (X2 to) (City Sydney)))

The list of active edges contains the following edges:

<0,0,.S,X1 City ToCity>

<0,1,.S,X1,City ToCity>

<0,2,.S,X1 City,ToCity>

<2,2,ToCity,X2 City>

<2,3,ToCity,X2,City>

<0,0,X1,from>

<1,1,City,melbourne>

<1,1,City,sydney>

<2,2,X2,to>

<3,3,City,melbourne>

<3,3, City,sydney>

To determine the rule selection decisions, like those shown above in Table 2, the parse tree of the correct parse is then examined along with edges on the active edge list. The parse tree of the correct parse contains rules that have either all terminal symbols, or all non-terminal symbols on their right hand side. To estimate speech recognition accuracy, rules of the parse tree that contain only terminal symbols on their right hand side are selected at step 708. For instance, the correct parse tree given above makes reference to rules 7, 2, 9, and 3. At the completion of parsing, these rules correspond to the following edges on the inactive edge list:

<0,1,from,>

<1,2,melbourne,>

<2,3,to,>

<3,4,sydney,>

At step 710, active edges that contain only terminal symbols in the "to be matched" field, and have empty "matched" fields are also selected. In the example above, this corresponds to the following active edges:

<0,0,X1,from>

<1,1,City,melbourne>

<1,1,City,sydney>

<2,2,X2,to>

<3,3,City,melbourne>

<3,3,City,sydney>

At step 712, the probability of recognising each of the selected rules from the correct parse tree is then estimated to be the probability of correctly recognising the words on the right hand of that rule, in preference to confusing it with any of the other selected active edges that have the same value of the parameter a in their five-tuple. That is, the probability of selecting a rule j of the parse tree from the set of n selected active edges is given by:

$$P(\text{select}(\text{rule}_j)) = \frac{P(\text{Confuse}(t_j, t_j))}{\sum_{i=1}^{n} P(\text{Confuse}(t_j, t_i))},$$

where $t_i$ represents the words on the right-hand side of rule i.

For instance, when examining the selected parse tree edge

<1,2,melbourne,> the rules referenced by the following selected active edges are considered:

<1,1,City,melbourne>

<1,1,City,sydney>

Each rule in the grammar is then mapped to a set of phonemes by substituting each symbol with one (ideally the most probable) pronunciation of that terminal. For example, to determine the probability of selecting rule 2 from rules 2 and 3, the following alignment and probability are generated:

m eh l b er n s ih d n iy $$P(\text{select}(\text{rule}_2)) = \frac{P(\text{Confuse}(\text{``melbourne''}, \text{``melbourne''}))}{P(\text{Confuse}(\text{``melbourne''}, \text{``melbourne''})) +}$$
$$P(\text{Confuse}(\text{``melbourne''}, \text{``sydney''}))$$

$$= \frac{P(\text{Confuse}(\text{``m eh l b er n''}, \text{``m eh l b er n''}))}{P(\text{Confuse}(\text{``m eh l b er n''}, \text{``m eh l b er n''})) +}$$
$$P(\text{Confuse}(\text{``m eh l b er n''}, \text{``s ih d n iy''}))$$

The probability of confusing one phoneme string with another P(Confuse( )) is estimated as the phonetic Levenstein distance between the two strings. Only the maximum probability alignment is considered, and the number of equally probable maximum probability alignments is considered to be one. If multiple pronunciations exist for each word, one of the pronunciations is randomly selected to reduce the complexity of generating the probability. This is considered valid because in most cases alternative pronunciations are phonetically similar.

In the case of the example above, when considering the edge
<0,1,from,>
the rules referenced by the following active edges are considered:
<0,0,X1,from>
The probability of correctly selecting rule 7 is then determined to be:

$$P(\text{select (rule}_7)) = \frac{P(\text{Confuse}(\text{``from''}, \text{``from''}))}{P(\text{Confuse}(\text{``from''}, \text{``from''}))} = 1$$

At step 714, the probability of correctly selecting all the rules for a phrase is then generated as the product of the probabilities for each of these rules.

At step 716, the probability of correctly recognising a set of phrases given a grammar is then estimated as the arithmetic mean of the probabilities of recognising each individual phrase correctly. This probability is used as an initial estimate 322 of the speech recognition accuracy for the dialog system.

The method described above for generating the speech recognition accuracy estimate 322 provides a single number of the form X % (for instance 80%). However, it is preferred that a measure of the confidence or uncertainty of the estimate is also generated (for instance, 80±10%). This is advantageous because many assumptions have been made in determining the estimate 322. To generate a confidence value for the estimate, a series of speech recognition measurements or experiments are performed. Like the experiments used to generate the confusion matrix, these experiments are performed once for each speech recognition configuration supported by the in-grammar speech recognition estimator 114. For each experiment, two values are measured. The in-grammar speech recognition estimate 322:

$$P_{est,t} = P(\text{recognition}|\text{ingrammar})$$

provides the estimated speech recognition accuracy predicted using the sentence, the grammar and the phoneme confusion matrix. The value $P_{est,t}$ represents the speech recognition accuracy obtained when a sentence is recorded and processed by a speech recogniser.

For any given experiment, a measure $O_i$ of the quality Of $P_{est}$ can be determined as:

$$O_i = \frac{1 - \frac{1}{P_{act,i}}}{1 - \frac{1}{P_{est,i}}} \quad (2)$$

If $O_i=1$, then the estimate $P_{est}$ was correct. If $O_i>1$, then Pest was optimistic, and if $O_i<1$, then $P_{est}$ was pessimistic. The value of $O_i$ will vary from experiment to experiment; from a series of experiments, a "typical" value of $O_i$ can be generated. In addition, a value $\Delta O$ can be measured which provides the expected variation in $O_i$ from experiment to experiment. The value $\Delta O$ can then be used to generate the expected value of Pact, given $P_{est}$ in any future experiment. Given a series of experiments, a least-squares estimate $O_{opt}$ of the typical value of $O_i$ can be generated using the following equation:

$$O_{opt} = \frac{\sum_n \left(1 - \frac{1}{P_{act,i}}\right) \cdot \left(1 - \frac{1}{P_{est,i}}\right)}{\sum_n \left(1 - \frac{1}{P_{est,i}}\right) \cdot \left(1 - \frac{1}{P_{est,i}}\right)} \quad (3)$$

The variance of $O_i$ around $O_{opt}$ can be determined using the following equation for sample variance listed in most statistical textbooks such as Thomas P. Ryan, *Modern Regression Methods*, published by John Wiley and Sons, Inc. In this equation, the value $O_{opt}$ is used in place of the mean value, as follows:

$$S^2(O) = \frac{\sum_n (O_i - O_{opt})^2}{n - 1} \quad (4)$$

This estimate is a point estimate that will approximate the actual variance of $O_i$ from the true mean of O only if there is a sufficiently large number of estimates. To take this into consideration, the estimate of the variance can be increased using the following standard statistical equation:

$$\hat{\sigma}^2(O) = \frac{(n-1) \cdot S^2(O)}{\chi^2_{1-\alpha}} \quad (5)$$

Where $\chi_{1-\alpha}^2$ is the $\chi^2$ value with $v=n-1$ degrees of freedom, and $\alpha$ is the probability that $$\sigma^2(O) \le \hat{\sigma}^2(O).$$

From $$\hat{\sigma}^2(O),$$

the 95% confidence interval for 0 can be generated as follows:

$$\Delta O = 1.96\sqrt{\hat{\sigma}^2(O)}$$

and $\Delta O$ can then be used to determine the expected variation in $\Delta P_{est}$ for any future experiment using the following approximation:

$$\Delta P_{act,i} = \frac{dP_{act,i}}{dO} \cdot \Delta O$$

It can be shown that $$\frac{dP_{act,i}}{dO} = -\frac{(1 - P_{est,i})P_{est,i}}{(P_{est,i} + (1 - P_{est,i}) \cdot O)^2}.$$

Substituting this into earlier equations, the following equation is obtained:

$$P_{est} = \frac{P_{est,i}}{P_{est,i} + (1 - P_{est,i}) \cdot O_{opt}} \pm \qquad (6)$$

$$\left( \frac{(1 - P_{est,i})P_{est,i}}{(P_{est,i} + (1 - P_{est,i}) \cdot O_{opt})^2} \cdot 1.96 \sqrt{\hat{\sigma}^2(O)} \right)$$

This equation can be used to update the estimate obtained using equation (1) through the use of experimental evidence. More importantly it provides an estimate that includes a confidence interval obtained using experiments.

Equation (6) has the following ideal properties:
1. If $0 \leq P_{est,t} \leq 1$, then $0 \leq P_{act,t} \leq 1$; and
2. If $O$ is normally distributed, then the variance of $P_{act}$ will approach 0 when $P_{est,t} \sim 1$ or 0, and will be largest when $P_{est,t} \sim 0.5$.

As well as, being a good approximation to a binomial distribution of $P_{act,i}$, it is also consistent with the fact that the closer that $P_{act,i}$ is to 0 or 1, the easier it is to predict $P_{act,i}$.

In an alternative embodiment, the confidence of the estimate 322 can be generated as follows. As described above, a series of experiments is performed, whereby representative phrases are spoken and recorded, and actual speech recognition accuracy measurements $P_{act}$ are then taken. A function $F( )$ is then defined such that $P_{act} = F(P_{est})$, as follows: if $P_{est} = 1$, then $$P_{act} = 1.$$

Otherwise, $$\text{let } O_{est} = \frac{P_{est}}{1 - P_{est}} \text{ and}$$

$O_{act} = K \times O_{est}$, where K is a constant, and $$P_{act} = \frac{O_{act}}{1 + O_{act}}.$$

K is determined by regression; that is, a standard fitting procedure is performed to determine the value of K that minimises the error between the function and data points of $(P_{est}, P_{act})$ pairs. $F( )$ is a monotonically increasing function that includes the data points (0,0) and (1,1). A value of K=1 corresponds to the linear relationship $P_{act} = P_{est}$. A value of K>1 corresponds to the scenario where $P_{est} \leq P_{act}$ for all points (i.e., $P_{est}$ is a pessimistic estimate), while K<1 corresponds to the scenario where $P_{est} > P_{act}$ for all points (i.e., $P_{est}$ is an optimistic estimate).

A estimate of the error $\Delta O_{act}$ referred to as the prediction interval can be determined from the line of regression. The 95% prediction interval is the interval into which 95% of the actual accuracy measurements will fall into. Methods for determining prediction intervals can be found at pp 21-30 in Thomas P. Ryan, *Modern Regression Methods*, published by John Wiley and Sons, Inc.

The prediction interval of the estimate of the actual probability $\Delta P_{act}$ can be generated from the prediction interval $\Delta O_{act}$ as follows:

$$\Delta P_{act} = \frac{2 \times \Delta O_{act}}{(1 + O_{act})^2 - (\Delta O_{act})}$$

Returning to FIG. 2, having generated the initial accuracy estimate 322 at step 204, the developer then decides at step 206 whether it is practical to perform the proposed tasks using speech recognition. If the initial accuracy estimate 322 is unacceptably low, then the development of the dialog system can stop at this point. The initial accuracy estimate 322 is a lower bound on the actual speech recognition accuracy that can be obtained, for two major reasons. The first reason is that the estimate 322 does not take into account those phrases that have not yet been predicted. The second reason is that the speech recognition grammar used by the final developed dialog application 128 is likely to be larger than the initial grammar 318 provided to the in-grammar recognition accuracy estimator 114.

The process described above can also be used to provide estimates for the improvement in recognition accuracy resulting from asking slightly different questions that elicit different responses. This can also be used to compare the applicability of different tasks to speech recognition.

If the developer decides to continue the development of the dialog system, an estimate of the number of example phrases that would need to be collected is then generated at step 207. Example phrases are collected to ensure that the speech recognition grammars are sufficiently broad to ensure good speech recognition accuracy. This is true whether the grammar is automatically generated by the grammatical inference engine 112, or generated manually by a human developer.

Specifically, the amount of effort required to generate a grammar is predicted as follows:
 (i) the effort required to generate a grammar, either by hand or by machine learning, is estimated to be proportional to, and in this case equal to, the number of training examples required to learn the grammar using machine learning; and
 (ii) the number of training examples required to learn the grammar is derived by fitting experimental results to a mathematical function, and extrapolating future values from it.

At step 208, the developer uses the simulator 116 to collect additional example phrases 402 from a number of people who are representative of the people who would use the developed dialog system. The simulator 116 simulates the interactions that a speaker would have with the system, with the speaker providing response phrases using text (i.e., keyboard) input. Alternatively, the developer can type the spoken responses provided by the speaker. In either case, effectively perfect speech recognition is used to collect the additional phrases 402. The simulator 116 combines these with the initial example phrases 314 to form example phrases 404. These are used by the development system 100 at step 210 to generate estimates 426 for the final accuracy and effort.

Figure 4:
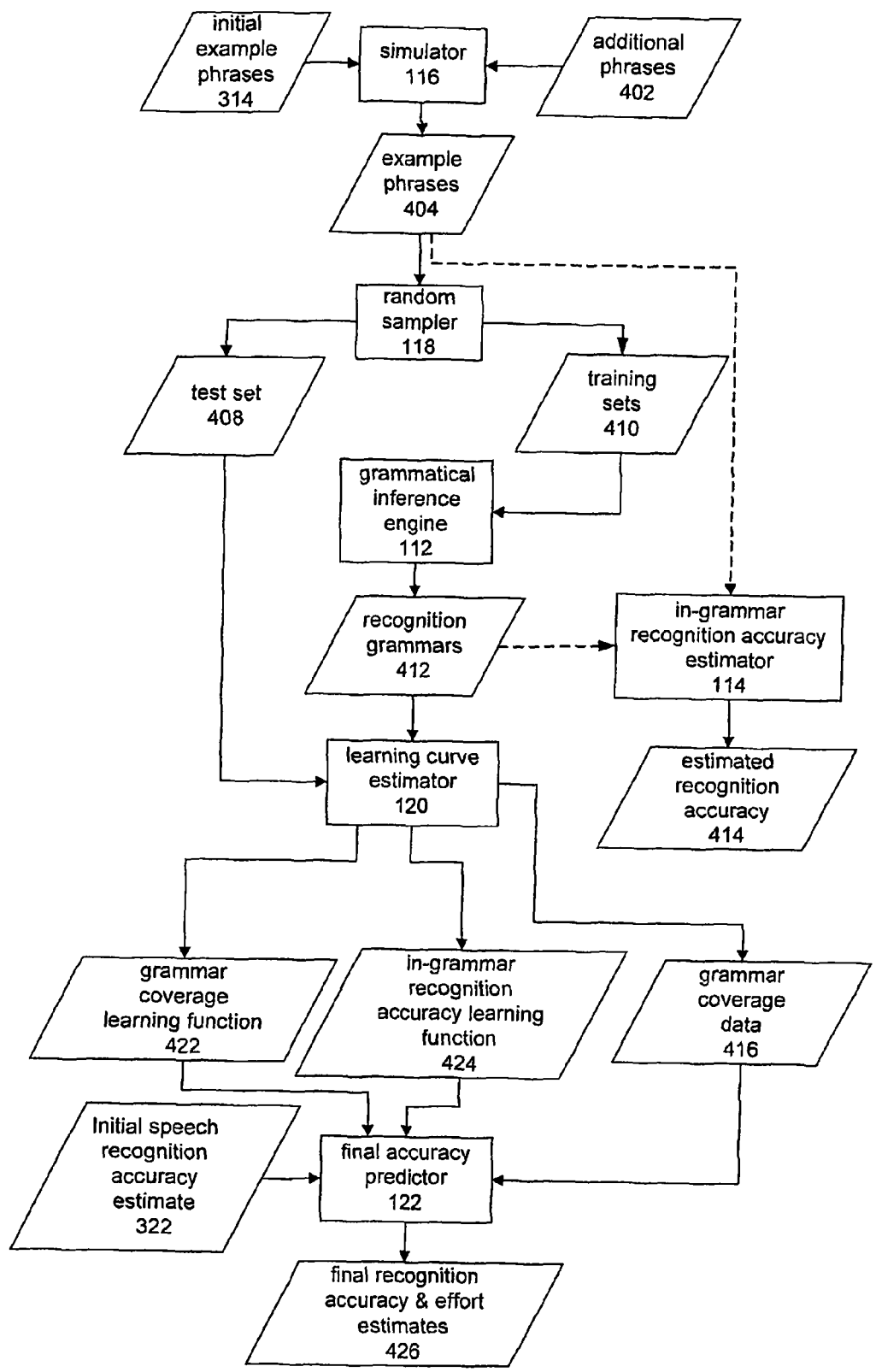
Figure 6:
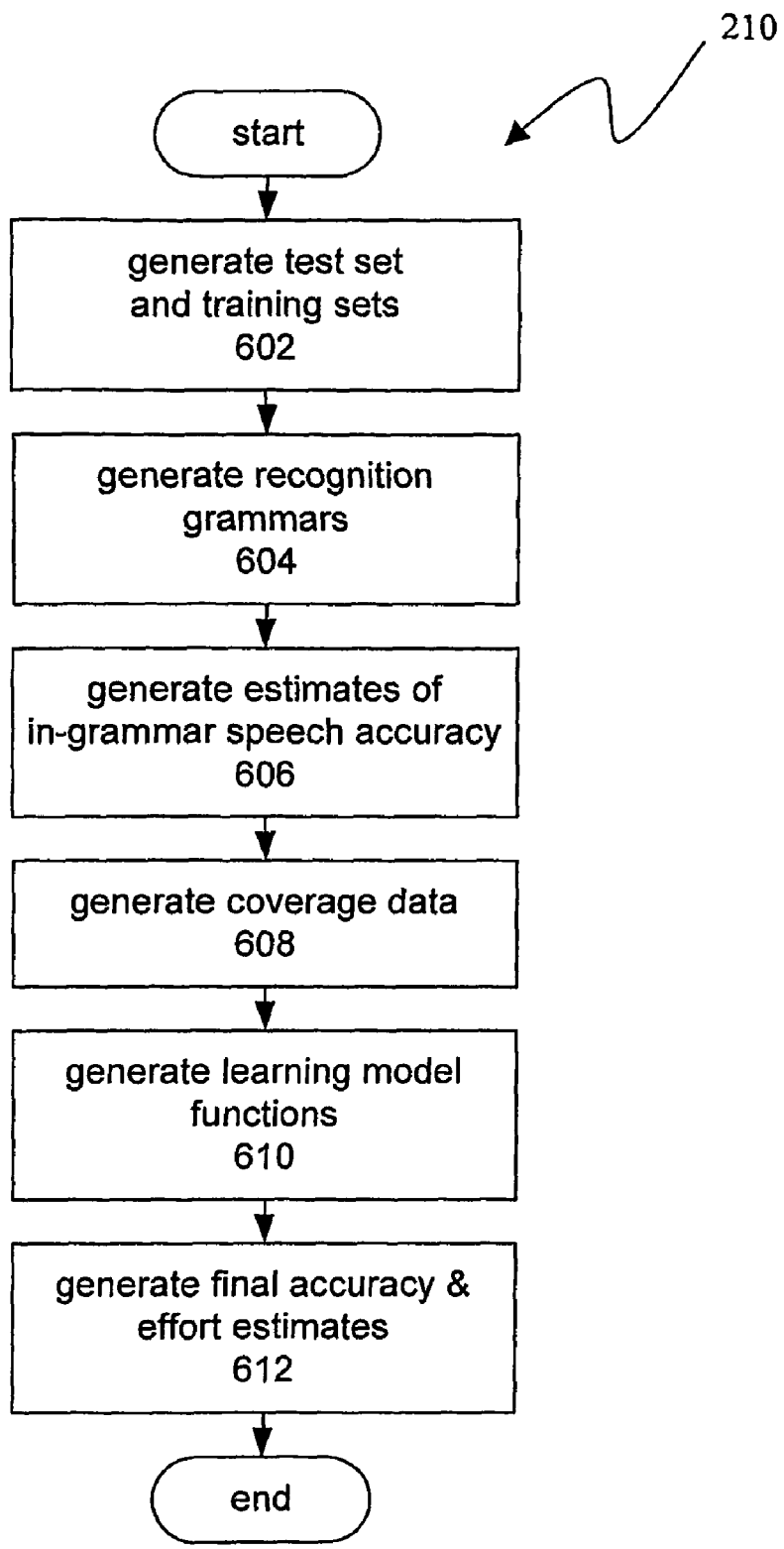
FIG. 6 is a flow diagram of a final accuracy and effort estimation process of the development process.

The final accuracy and effort estimates 426 are generated by a final accuracy and effort estimation process 210, as shown in FIG. 6 with reference to FIG. 4. At step 602, the example phrases 404 are provided to the random sampler 118, which randomly divides them into a test set 408 and a number of training sets 410 of varying sizes. At step 604, the training sets 410 are used by the grammatical inference engine 112 to generate respective speech recognition grammars 412.

At step 606, the example phrases 404 can optionally be processed by the in-grammar speech recognition accuracy estimator 114 using the inferred grammars 412 to measure how the estimated in-grammar speech recognition accuracy 414 varies with different numbers of training examples.

At step 608, the learning curve estimator 120 measures the percentages of phrases in the test set 408 that are predicted by each of the different sized grammars 412, and these are subsequently used to predict the number of samples required to obtain a desired grammar coverage, as described below. The resulting output is referred to as learning curve or grammar coverage data 416.

The learning curve estimator 120 is based on computational learning theory, which is the theoretical study of machine learning, as described in T. M. Mitchell, *Machine Learning*, McGraw-Hill, Boston USA, 1997. Machine learning attempts to answer questions such as, "How much training data is required for a learner to learn a task" and "Can the difficultly of learning a particular task be described independent of the learning process". Although general answers to these questions are not known, an extensive field of research exists.

An important model in computational learning theory is the Probably Approximately Correct (PAC) theory. The model is designed to model the amount of training data required for a learner to learn boolean valued concepts from noise-free training data. A boolean value concept is one where a logical statement is determined to be either true or false. Automated grammar learning (or grammatical inference as it is sometimes known) can be considered to be the learning of a boolean-valued concept whereby the learned grammar can be used to determine whether a phrase is in a language or not. For example, the phrase "I have a pet cat" is a phrase in the English language, while the phrase "cat pet a have I" is not.

In the PAC learning model, a learning process is not required to output a zero error hypothesis. The learning process is only required to create a function with some small finite error, i.e., the learnt function will have a limited accuracy. In the case of learning a grammar, this corresponds to predicting only a portion (e.g., 90%) of spoken phrases and attaching the correct meaning to them. In addition, the learning process is not required to learn a target function for every sequence of randomly drawn training samples. Instead, the problem can be defined as having a finite probability of learning an approximate function.

PAC learning is not applicable to all learning tasks. It is only applicable to consistent learners, which are learning tasks where the learnt function can always classify the training examples exactly. In addition there are restrictions on the computational resources required for learning.

The basis of PAC theory relates to the class of learning algorithms that have a finite hypothesis space, although the theory has been extended to larger task of learning functions that exist in an infinite hypothesis space (i.e., the functions to be learned).

The fundamental PAC process for determining the size of training data required to learn a target function is defined by the function:

$$m \geq \frac{1}{\varepsilon}\left(\ln|H| + \ln\left(\frac{1}{\delta}\right)\right),$$

where
m=number of training examples
$\varepsilon$=error of learned function
$\delta$=probability of learning the target function
|H|=size of hypothesis space
[correct?]

Alternative functional forms have also been used to determine the required number of training examples as functions of H, $\varepsilon$ & $\delta$ and are generally based on knowledge of the particular task at hand. The concept of PAC learnability has also been extended to include the concept where the hypothesis space is infinite, using a measure known as the Vapnik-Chervonenkis dimension or VC dimension.

Using the VC dimension, the function that defines the relationship between the number of samples required to learn a function and accuracy is somewhat similar to the basic PAC equation. In addition, there are two functions available when using the VC dimension, one for an upper bound and one for a lower bound:

$$m_{upper} = \frac{1}{\varepsilon}\left(4\log_2\left(\frac{2}{\delta}\right) + 8VC(H)\log_2\left(\frac{13}{\varepsilon}\right)\right)$$

$$m_{lower} = \max\left[\frac{1}{\varepsilon}\log\left(\frac{1}{\delta}\right), \frac{VC(C)-1}{32\varepsilon}\right]$$

The first function is a function of the VC dimension of the hypothesis space of the learning process, while the second is a function of the VC dimension of the concept space C (i.e., the functions used by the learner). We can see that these two functions can result in a huge difference between the upper and lower bounds on the estimate of the number of samples required to learn a function. Consider, for example, the case where VC(H)=VC(C)=6, $\delta$=0.05, $\varepsilon$=0.05. The equations provide an upper bound of 8127 samples and a lower bound of 86 samples.

The basic PAC function can be rearranged as a function that defines the estimated accuracy, for a given number of training examples, as:

$$A \leq 1 - \frac{1}{m}\left(\ln|H| + \ln\left(\frac{1}{\delta}\right)\right),$$

where A=1-$\varepsilon$=accuracy. This function defines an upper limit on the accuracy of the learner, given the number of samples. The function can be used to crudely approximate the learning cycle. During a learning cycle, the probability of learning the target function and hypothesis size are fixed. As a result, a plot of accuracy as a function of the number of samples takes the form of an inverted hyperbola. It should be noted that this function does not fall between the required values of zero and one, as it returns negative accuracy below a certain value of m. In addition, the model does not include any knowledge of the specific learning task.

As described above, example phrases 404 (typically around a thousand samples or phrases) generated using the simulator 116 are divided into two groups: a test set 408, and training sets 410 of various sizes (e.g., four training sets respectively comprising 100, 200, 500, & 700 samples). The test set 408 contains at least 308 samples. The training sets 408 are provided to the grammatical inference engine 112, which generates a number of different grammars using grammatical inference. For each of the grammars 412, the percentage of phrases in the test set 408 that is not predicted by the grammatical inference engine 112 is determined as a number between 0 and 1.

The grammars 412 generated by the grammatical inference engine 112 and the corresponding training sets 410 can also be provided to the in-grammar speech recognition accuracy estimator 114 to generate respective estimates 414 of the in-grammar speech recognition accuracy that would be obtained with the given numbers of training samples. Alternatively, if the simulator 116 collected a statistically significant number of speech samples, the speech recognition accuracy obtained when recognising those sentences can be measured directly. Alternatively, the estimated speech recognition accuracy0 414 obtained from the in-grammar speech recognition accuracy estimator 114 and the measured speech recognition accuracy could be combined using a Bayesian estimator.

The learning curve estimator 120 uses regression to determine a linear function 422 that predicts the percentage of unpredicted phrases. This function 422 is referred to as the grammar coverage learning function 422. The learning curve estimator 120 uses the following tools and techniques of regression analysis:
(i) using linear regression to infer linear relationships between two measured variables;
(ii) transforming non-linear variables to enable linear regression; and using prediction intervals to estimate the accuracy of predicted values.

The learning curve estimator 120 uses the number of training examples as the independent variable, and the natural logarithm of the percentage of unpredicted phrases as the dependent variable:

$$\ln(1-A) = \alpha + \beta m + E,$$

where
 $\alpha$=a statistically derived constant (axis intercept)
 $\beta$=a statistically derived constant (slope)
 E=random error
 m=the number of training samples
 A=percentage of phrases in grammar=$P_{ingrammar}(m)$
This is equivalent to fitting the learning model function 422;

$$A \leq 1 - e^{\alpha + \beta m + E}$$

to the training data. Although the exponential functional form is preferred, a number of different functions can be alternatively used to provide similar results. A basic rule of curve fitting is that, all other things being equal, the simplest model that describes the relationship should be adopted.

The learning curve estimator 120 also generates a function 424 that provides estimates of the speech recognition accuracy as a function of the number of training examples m. This function 424 is referred to as the in-grammar recognition accuracy learning curve function 424. The preferred form of this function is also an exponential function:

$$P_{recognition|ingrammar}(m) = B + C \times e^{\alpha + \beta m + E},$$

where
 B=statistically derived constant (intercept)
 C=statistically derived constant (slope)
 $\alpha$=derived from $P_{ingrammar}(m)$
 $\beta$=derived from $P_{ingrammar}(m)$
 E=random error
 m=number of samples The constants B and C are determined by fitting this function to the measured speech recognition accuracy values determined for each of the recognition grammars 412.

After the two learning model functions 422, 424 have been generated by the learning curve estimator 120 at step 610, they are combined by the final accuracy predictor 122. At step 612, the final accuracy predictor 122 generates estimates 426 for (i) the final speech recognition accuracy that would be obtained if the dialog system was developed and (ii) the effort required to provide a desired accuracy. This is done on the basis of the grammar coverage data 416, the learning functions 422, 424, and the initial speech recognition accuracy estimate 322.

The final accuracy predictor 122 uses a final accuracy prediction equation to describe the probability of correctly recognising a phrase verbatim:

$$P_{recognition}(m) = P_{ingrammar}(m) \times P_{recognition|ingrammar}(m),$$

where:
 $P_{recognition}(m)$=the probability that all the words in the phrase are successfully recognised=sentence accuracy;
 $P_{ingrammar}(m)$=the probability that the phrase is in-grammar, as a function of the number of training examples=the grammar coverage learning function 422; and
 $P_{recognition|ingrammar}(m)$=the probability that the phrase is correctly recognised given that it is in-grammar as a function of the number of training examples=the in-grammar recognition accuracy learning curve function 424.

Maximising this equation maximises the probability of successfully recognising a phrase. The maximum probability can be found by either determining its value for different numbers of training examples and selecting the largest value, or by solving it algebraically.

The final accuracy prediction equation is used to estimate the number of samples (i.e., the effort) required to learn the grammar. Because the grammar coverage learning function 422 is asymptotic, it cannot equal 0%. For this reason, the number of samples required to learn the function to an accuracy of some arbitrarily small error rate is first selected. For example, the number of examples required to infer the grammar to an error rate of less than 1% is found by the following equation:

$$m = \frac{-2 \times \ln(10) - \alpha}{\beta}$$

The speech recognition accuracy at this point can be found by substituting this value of m in the final accuracy prediction equation describing $P_{recognition}(m)$.

A process for predicting the probability of recognising a phrase verbatim has been described above. In many speech recognition applications, a more useful measure is the natural language accuracy. The natural language accuracy ($P_{nl}(m)$) is the percentage of utterances that were recognised with the correct meaning. In contrast, the sentence accuracy is the probability of recognising a phrase verbatim (i.e., $P_{recognition}(m)$) Natural language accuracy and sentence accuracy are related in that when the sentence accuracy is 0, the natural language accuracy is also 0; when the sentence accuracy is 1, the natural language accuracy is 1. The natural language accuracy is always equal to or greater than the sentence accuracy in the normal case when the grammar attaches the correct meaning to a phrase. For that reason, a good function to describe the relationship between sentence accuracy and natural language accuracy is as follows:

If $P_{recognition}=1$, then $P_{nl}=1$.

Otherwise, let $$O_{recognition} = \frac{P_{recognition}}{1 - P_{recognition}}$$

and $$O_{nl} = K_2 \times O_{recognition},$$

where $K_2$ is derived from a line of regression:

$$P_{nl} = \frac{O_{nl}}{1 + O_{nl}}$$

This enables a prediction interval to be generated from the line of regression using the same method described above for generating a prediction interval from a line of regression used to correlate measured speech recognition accuracy with predicted speech recognition accuracy.

Returning to FIG. 2, the developer decides, at step 212, whether or not to continue the development of the spoken dialog application 128, based upon these estimates 426. If the developer decides to continue the development of the spoken dialog system 100, they can simulate and refine the system further at step 214, as described in Australian Patent Application 2002951244. During this step, the developer can, if desired, provide updated measurements of speech recognition accuracy and grammar coverage at various stages of development in order to update the estimates 426 of maximum speech recognition accuracy and the number of samples required to be collected.

Many modifications will be apparent to those skilled in the art without departing from the scope of the present invention as herein described with reference to the accompanying drawings.

The invention claimed is:

1. A process for estimating the speech recognition accuracy of a dialog system, including steps executed by a computer system comprising:
generating a grammar from a plurality of example phrases;
determining respective probabilities for correctly identifying words of an input phrase with corresponding words of said grammar; and
generating a probability for correctly recognizing said input phrase by multiplying said respective probabilities.

2. A process as claimed in claim 1, wherein said probabilities are probabilities of confusing words of said input phrase and words of said grammar.

3. A process as claimed in claim 2, wherein said probabilities of confusing are determined on the basis of phonetic similarities of words of said input phrase and words of said grammar.

4. A process as claimed in claim 3, wherein the probability of confusing one word with another is determined on the basis of a confusion matrix generated from one or more probabilities of confusing phonemes with other phonemes, deleting phonemes, and/or inserting phonemes.

5. A process as claimed in claim 4, wherein said probabilities are determined on the basis of phonetic Levenstein distances between phonemes.

6. A process as claimed in claim 4, wherein a probability of confusing one word with another is determined from a maximum probability alignment of phonemes of said words, said alignment generated from said confusion matrix.

7. A process as claimed in claim 3, wherein said probability of confusing one phrase with another is derived using a list of branching decisions within a context-free grammar.

8. A process as claimed in claim 7, wherein said branching decisions are determined by generating from said grammar inactive edges corresponding to a parse tree, and active edges including only terminal symbols.

9. A process as claimed in claim 8, wherein said edges are generated on the basis of a form of said grammar wherein each rule of said grammar is either empty, or the one or more symbols on the right hand side of the rule are all terminal symbols or all non-terminal symbols.

10. A process as claimed in claim 1, including generating an estimate for the speech recognition accuracy of said dialog system from the probabilities for correctly recognizing each of a plurality of input phrases.

11. A process as claimed in claim 1, including:
generating an estimate of speech recognition accuracy achievable when using said dialog system on the basis of probabilities of confusing phonemes of input phrases with phonemes of said grammar to allow a developer of said dialog system to determine development of said dialog system.

12. A process as claimed in claim 11, including generating a measure of the uncertainty of said estimate.

13. A process for use in developing a dialog system, including:
generating grammars for said dialog system on the basis of respective sets of example input phrases for said dialog system, said sets including different numbers of example input phrases;
determining, on the basis of said grammars, a relationship between a number of example input phrases and an estimated probability that an input phrase is correctly recognized; and
generating an estimate of the number of example input phrases required to achieve a predetermined speech recognition accuracy when using said dialog system to allow a developer of said dialog system to determine development of said dialog system.

14. A process for developing a dialog system, comprising generating estimate data representative of the number of example phrases required to achieve a predetermined speech recognition accuracy when using said dialog system wherein said generating includes:
generating a test set of example input phrases for said dialog system;
generating training sets of example input phrases for said dialog system, said training sets comprising different respective numbers of said example input phrases;
generating respective grammars on the basis of said training sets;
determining the respective portions of said test set covered by said training sets; and determining, on the basis of said portions and the respective numbers of input phrases, a relationship between a number of example input phrases and an estimated probability that an input phrase is correctly recognized.

15. A process as claimed in claim 14, including generating a value for the number of example phrases required to achieve said predetermined speech recognition accuracy on the basis of said relationship.

16. A process as claimed in claim 14, wherein said step of determining a relationship includes:
determining a first relationship between a number of example input phrases and a probability that an input phrase is in-grammar;
determining a second relationship between a number of example input phrases and a probability that an in-grammar input phrase is correctly recognized; and determining, on the basis of said first relationship and said second relationship, said relationship between a number of example input phrases and an estimated probability that an input phrase is correctly recognized.

17. A process as claimed in claim 14, including determining a relationship between a probability that an input phrase is correctly recognized and a probability that a meaning of said input phrase is correctly recognized.

18. A process as claimed in claim 14, wherein said test set and said training sets are generated by randomly selecting phrases from a plurality of example input phrases for said dialog system.

19. A process as claimed in claim 14, wherein said predetermined speech recognition accuracy includes an estimate of the maximum speech recognition accuracy achievable when using said dialog system.

20. A process for predicting development of a dialog system, including: providing example phrases for said spoken dialog system;
generating a test set and training sets of various sizes from said example phrases; generating respective grammars from said training sets;
determining respective portions of said test set not predicted by said grammars;
determining a relationship between said portions and said sizes; and
determining a probability that a spoken phrase provided to said dialog system is consistent with at least one of said grammars.

21. A process as claimed in claim 20, wherein said relationship is determined by regression.

22. A process as claimed in claim 21, wherein said process includes generating respective values for said regression from said portions of said test set not predicted by said grammars.

23. A process for use in developing a dialog system, including:
generating first function data, representing the respective probabilities that a phrase provided to said dialog system is predicted by grammars of said dialog system as a function of the number of example phrases used to generate said grammars; generating second function data, representing the probability that an in-grammar phrase provided to said dialog system is correctly recognized as a function of the number of example phrases used to generate said grammars;
generating a third function on the basis of said first function and said second function, said third function representing the probability that a spoken phrase provided to said system is correctly recognized as a function of the number of examples used to generate said grammars.

24. A process as claimed in claim 23, wherein the process includes generating an estimate of the maximum speech recognition accuracy achievable for said spoken dialog system.

25. A process as claimed in claim 23, wherein the process includes generating an estimate of said number of said example phrases corresponding to said maximum speech recognition accuracy.

26. A process as claimed in claim 23, wherein said estimate represents the effort required to develop said spoken dialog system.

27. A process as claimed in claim 23, wherein measurements of speech recognition accuracy and/or grammar coverage at various stages of development of said spoken dialog system may be used to update the estimate of maximum speech recognition accuracy and/or the estimate of the number of samples required to be collected to achieve said maximum speech recognition accuracy.

28. A development system having components for executing the steps of any one of claims 1 to 27.

29. A computer readable storage medium having stored thereon program code for executing the steps of any one of claims 1 to 27.

30. A system for developing a dialog system, comprising a computer system configured with:
a grammatical inference engine for generating grammars for said dialog system on the basis of respective sets of example input phrases for said dialog system, said sets including different numbers of example input phrases;
a learning curve estimator for determining, on the basis of said grammars, a relationship between a number of example input phrases and an estimated probability that an input phrase is correctly recognized; and
an estimator for generating an estimate of the number of example input phrases required to achieve a predetermined speech recognition accuracy when using said dialog system to allow a developer of said dialog system to determine development of said dialog system.

31. A system as claimed in claim 30, including a simulator for generating prompts for said dialog system and for receiving example input phrases in response to said prompts.

32. A system as claimed in claim 31, including a sampler for randomly selecting from said example input phrases to provide said sets.

33. A system as claimed in claim 32, wherein said sampler is adapted to randomly selecting from example input phrases to provide a test set of input phrases, and wherein said relationship is determined on the basis of respective portions of said test set predicted by said grammars.

* * * * *